United States Patent [19]
Masters et al.

[11] Patent Number: 5,970,677
[45] Date of Patent: Oct. 26, 1999

[54] TIE CONNECTOR FOR MODULAR BUILDINGS

[76] Inventors: William C. Masters, 3453 Southcrest Blvd., Lakeland, Fla. 33813; William J. Kalker, Jr., 33 Rockwood La., Monroe, Conn. 06468

[21] Appl. No.: 08/976,415

[22] Filed: Nov. 21, 1997

Related U.S. Application Data

[63] Continuation of application No. 08/677,831, Jul. 10, 1996, abandoned, which is a continuation of application No. 08/254,704, Jul. 6, 1994, abandoned.

[51] Int. Cl.$^6$ .................................................... E04B 1/38
[52] U.S. Cl. .............................................. 52/712; 52/295
[58] Field of Search .............................. 52/23, DIG. 11, 52/169.12, 4, 5, 148, 149, 702, 708, 712, 264, 295, 293.3, 699

[56] References Cited

U.S. PATENT DOCUMENTS

| | | | |
|---|---|---|---|
| 1,172,126 | 2/1916 | Finette | 52/295 X |
| 3,750,360 | 8/1973 | Kingston | 52/295 X |
| 3,842,554 | 10/1974 | Swick | 52/264 |
| 4,530,194 | 7/1985 | Linton et al. | 52/264 X |
| 4,543,757 | 10/1985 | Cosgrove | 52/298 |
| 5,092,097 | 3/1992 | Young | 52/264 X |
| 5,150,553 | 9/1992 | Commins et al. | 52/264 |
| 5,375,384 | 12/1994 | Wolfson | 52/295 |
| 5,390,455 | 2/1995 | Antolini | 52/295 X |
| 5,595,031 | 1/1997 | Commins | 52/264 |

Primary Examiner—Creighton Smith
Attorney, Agent, or Firm—Robert L. Wolter; Holland & Knight LLP

[57] ABSTRACT

A tie connector for joining a modular type building or the like to the ground. One version of the tie connector having a flat substantially rectangular with an elongated slot through one side and at least one opening at the other end. The elongated slot provides an attachment site for a hurricane type strap to be inserted and coupled to a buckle. The opposite end of the tie connectors are attached to horizontal support members typically around the perimeter of the modular building. Another version of the tie connector having two flaps that wrap around two sides of a vertical support member allowing a bolt to be inserted through and be affixed. A final version of the tie connector having a vertical flap bent in a relatively perpendicular fashion such that the flap can be mounted around a side of a vertical support member. The hurricane straps are then inserted through the elongated slots and secured to a ground anchor. The elongated slot has the unique feature of rounded edges of sufficient radius thereby omitting any type of cutting effect that might occur when the straps are under high stress conditions.

26 Claims, 3 Drawing Sheets

TIE CONNECTOR FOR MODULAR BUILDINGS

This application is a continuation of application Ser. No. 08/677,831, filed Jul. 10, 1996, now abandoned, which is a continuation of application Ser. No. 08/254,704, filed Jul. 6, 1994, now abandoned.

BACKGROUND OF INVENTION

This invention relates to an apparatus for connecting a modular building to a ground anchor via a tie connector thereby directly transferring the load to the earth. The primary use of these connectors are to serve as a means by which a conventional hurricane anchoring system may be attached to elements that will be under the high vertical load conditions. Connecting a modular type building or the like to a secured ground anchor is essential when the modular building is subjected to strong winds such as hurricanes, tornadoes and other violent storms.

More specifically, this invention provides a tie connector, that is preinstalled to a vertical support member during the construction of modular type buildings. Additionally, the tie connector provides an elongates slot protruding from beneath the modular building wherein an anchor strap can be easily connected. The opposite end of the tie connector is secured to a vertical support member of the modular building using three types of affixing designs. One version of the tie connector has a flat rectangular body with bolt holes at one end to secure onto a vertical support member and an elongated slot at the other end to secure onto a hurricane strap. Other versions of the tie connector have varying affixing means to secure onto the vertical support site.

In the past the primary method of resisting the vertical force component was through the use of hurricane anchors at each of the hurricane strap running up one wall, over the roof and down the other side of the home. This method created a problem because many times the roof rafters used were not capable of withstanding the forces applied to them. A second method was to use a manufactured section of hurricane strap material with holes punched at one end. As a result of the high number of holes placed in the hurricane strap material, the capacity of the connections was greatly reduced. To work around this, the industry placed theses straps at a closer spacing taking into consideration the reduced capacity.

Under new Federal regulations, vertical ties must be capable of withstanding 3150 pounds must be placed at each diagonal tie location. This mandate created a problem that the manufactured housing industry never had to deal with, consequently producing a need for the vertical tie connectors that will still permit the use of the hurricane ground anchors on the market today.

It has been customary to secure mobile homes and other types of modular buildings to the ground using special straps and ground anchors. Several approaches have been provided for, in Dannemiller of U.S. Pat. No. 4,570,403 a "Means for anchoring a prefabricated, modular building to a foundation wall takes the form of an integral sheet metal strap formed with a base flange and intermediate body section for embedment in the foundation wall and an exposed upper, plate-like building attachment section extending outwardly from the intermediate body section above the foundation wall and formed with a weakened, bendable intermediate portion and an outer perforated plate portion for fastening to the base of the building." While this invention has its advantages, it does not allow the prefabricated building to be connected to a ground anchor via the floor or foundation. Additionally, the circular hole 2 is used only to accept a steel reinforcing bar and is not designed to be secured to a horizontal support member.

Another approach is taught by Lopes, in U.S. Pat. No. 4,294,053, wherein "An improved anchor is provided for use with a mobile home having an underframe with an I-beam and wherein the mobile home is mounted above a base. The anchor comprises a pair of spaced clamping elements, each clamping element having an upper flange engaging portion for engaging the I-beam and a lower down-wardly depending portion. One end of a chain is positioned between the downwardly depending portions of the clamping elements while a clevis is inserted through registering apertures in the downwardly depending portions and also through a link of the chain to thereby secure said end of the chain to the clamping elements. The other end of the chain is attached via a turnbuckle to the base." The disadvantage of the approach is that an I-beam must be present to provide a connection site for this type of anchor to work. Furthermore, the location of the I-beams are not always positioned at the optimum location where the connections will have maximum leverage.

Still another approach is taught in the art of Thornbrugh of U.S. Patent Number wherein "Various different types of anchors and an anchor system using these anchors for house trailers and the like are disclosed. One of the anchors disclosed is designed for use in a concrete slab and the others are designed to meet specific soil conditions. Thus, of the various different anchors disclosed, the one chosen for a given anchor system depends upon either the soil conditions where the trailer is located or the existence of a concrete trailer pad. In addition, the anchors are designed so that they can be driven in place by means of power tools. The anchor system comprises a plurality of anchors and a chain and turnbuckle arrangement associated with each anchor. Brackets are attached to the trailer frame at various different positions along the frame. The anchors are driven into the ground or concrete as the case may be along the trailer and a separate chain and turn buckle arrangement is connected between each anchor and frame bracket. The turnbuckle are then adjusted to remove any lack in the chain." One disadvantage of this approach is that when the house trailers are fully assembled, there may not be enough locations to secure the brackets to adequately secure the house.

SUMMARY OF THE INVENTION

Accordingly, it is the primary object of this invention to provide a unique tie connector to secure a prefabricated, modular type building securely to the ground. The tie connector being affixed to the modular building at one end with the other end being affixed to a hurricane type strap. The hurricane strap is then affixed to the ground via a hurricane type ground anchor.

Another object of this invention is to provide an elongated slot built into the body of the tie connector that will provide an attachment site for a hurricane strap. The hurricane strap will be inserted through the slot around and affixed to a provided buckle.

Another object of this invention is to have the tie connector installed during construction of the modular building. This will assure and facilitate proper installation when the modular building is to be secured to the ground.

Still another object of this invention is to provide a elongated slot, positioned on the tie connector, that will extend beneath a horizontal support member. This will allow the user to have easy access when a hurricane type strap is to be installed through the elongated slot.

A further object of this invention is to provide an elongated slot with rounded edges that will not cut into a hurricane strap during stress. The rounded edges having a radius of sufficient size thereby omitting a knife or cutting effect on the strap when under stress.

Another object of this invention is to provide a vertical flap that will secure onto a vertical support member of the modular building. These vertical flaps of the tie connectors will be installed around the perimeter of the modular building to prevent any type of lifting movement.

Still a further object of this invention is to provide a vertical flap that will secure onto a vertical support member of the modular building. The vertical flap will have at least one bolt to secure onto a vertical support member of the modular building giving additional support and stability.

Still yet another object of this invention is to provide a tie connector with a vertical flap that is bent around in a perpendicular fashion relative to the body of the tie connector that can be secured to a side of a vertical support member.

A further object of this invention is to provide a tie connector having two vertical flaps that can wrap around two sides of a vertical support member. This will allow bolts to be inserted through both flaps, the vertical support member and secured at the other end via nuts.

Still another object of this invention is to have the thickness or gauge of the tie connector varied to accommodate various stress requirements.

In carrying out this invention in the illustrative embodiment thereof, a plurality of tie connectors are installed during construction of modular buildings whereby the varied style of the vertical flaps of the tie connectors are affixed to vertical support members. The tie connectors are installed around the perimeter of the modular building to provide maximum stability. The other end of the tie connector contain built-in elongated slots that are exposed beneath the modular building. After the modular building is set in place, hurricane straps are inserted through the elongated slots and coupled together with buckles. The buckles are then secured to the ground via hurricane type ground anchors. Conveniently, the user may connect one end of a Hurricane strap to the elongated slot from the tie connector and the other end to a Hurricane buckle. The Hurricane buckle is then connected to a Hurricane ground anchor.

BRIEF DESCRIPTION OF THE DRAWINGS

This invention, together with other objects, features, aspects and advantages thereof, will be more clearly understood from the following description, considered in conjunction with the accompanying drawings.

Seven sheets of drawings are furnished, sheet one contains FIG. 1, sheet two contains FIG. 2, sheet three contains FIG. 3, sheet four contains FIG. 4, sheet five contains FIG. 5, sheet six contains FIG. 6, and sheet seven contains FIG. 7.

FIG. 5 is an orthographic view of the tie connector clearly showing the elongated slot where the hurricane strap is to be affixed. The upper part having two flaps that are designed to wrap around a vertical support member and have at least one opening to allow at least one bolt to fit through.

DESCRIPTION OF THE PREFERRED EMBODIMENTS

Figure 1:
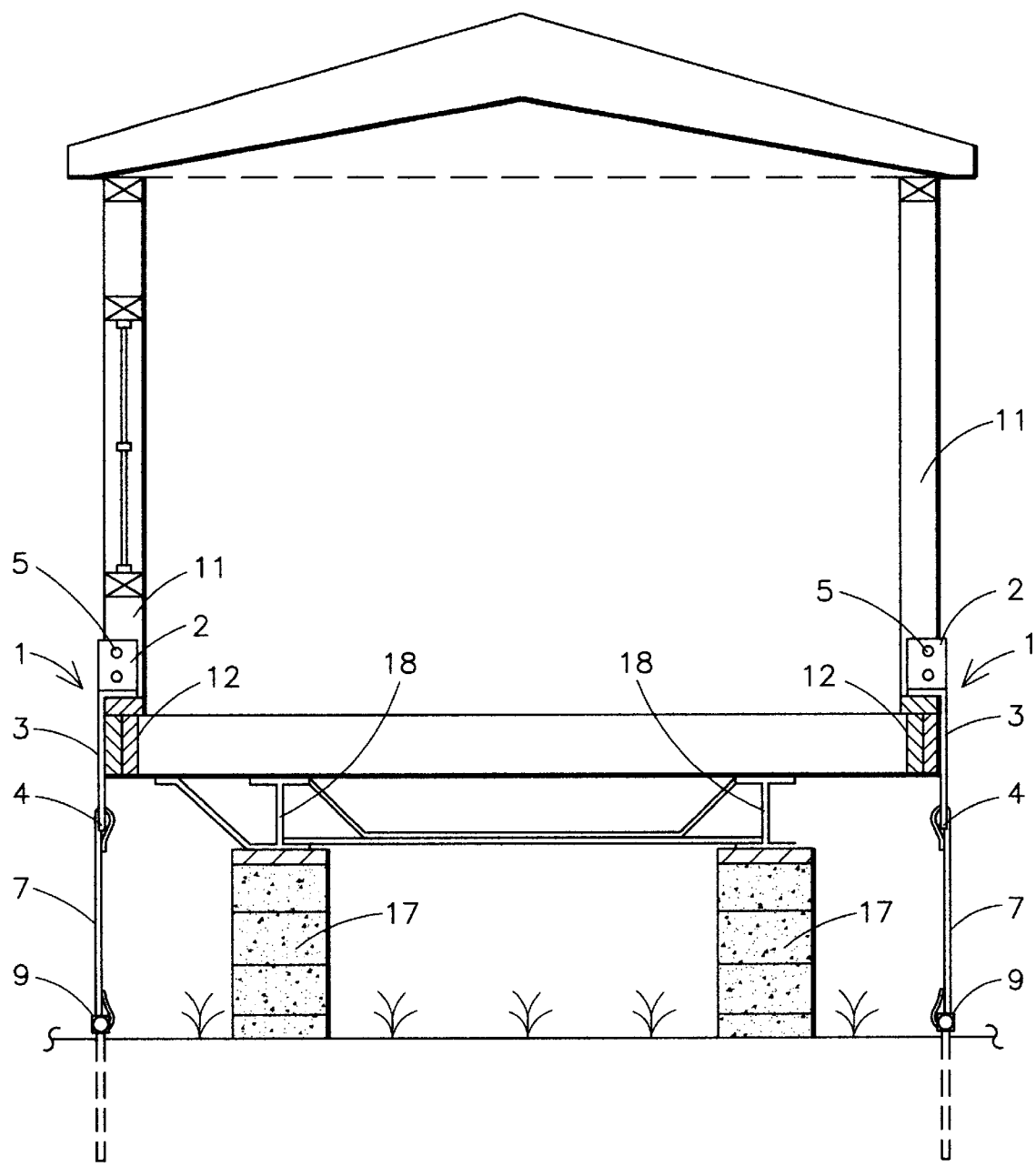
FIG. 1 is a side cut-away view of a modular building showing where the tie connectors are to be installed.

Referring now to FIG. 1, a tie connector referred to generally by the reference numeral 1 is made of a elongated slit 4 at one end. The elongated slit 4 providing an attachment site for a Hurricane strap 7 to connect to which in turn is affixed to Hurricane ground anchor 9. The top of the tie connector 1 having vertical flaps with bolts 5 inserted through and affixed to a vertical support member 11. A horizontal support member 12 being abutted against the side surface 3 and supporting the vertical support member 11. The modular building being supported by I-beams 18 which in turn are supported by a plurality of blocks 17.

Figure 2:
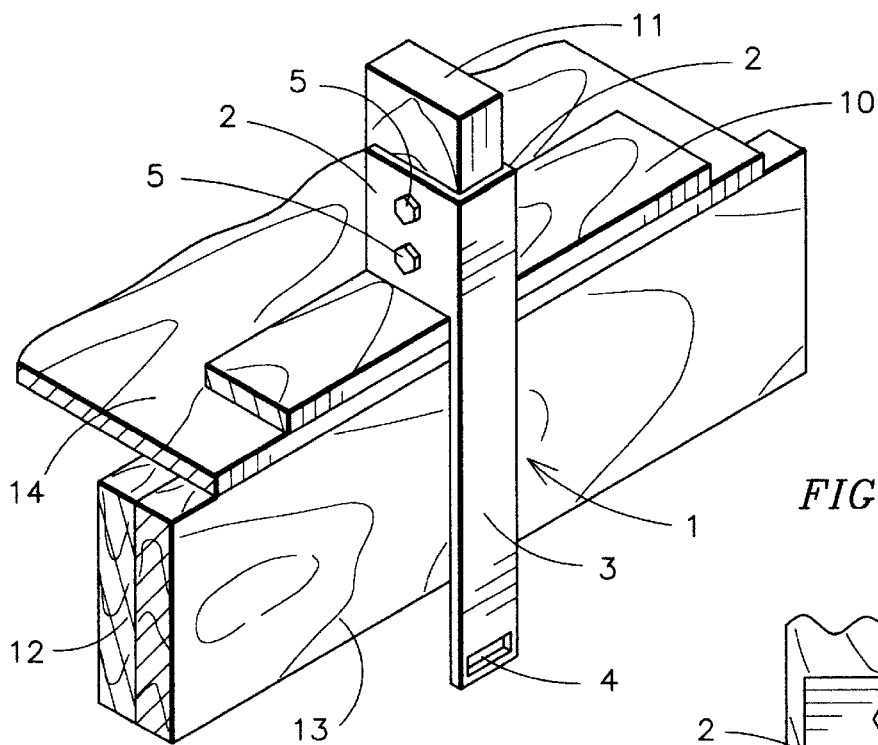
FIG. 2 is an orthographic view of the tie connector installed on a vertical support member showing the elongated slot.

Referring now to FIG. 2, we see a tie connector 1 having an elongated slot 4 at one end. A side surface 3 being abutted against a horizontal support member 13 and having the elongated slot 4 extending downward beneath the supports 13. The vertical flaps 2 having bolts 5 inserted through and affixed to a vertical support member 11. The vertical support member 11 being supporting by horizontal support members 12 and 13. Additionally, the top portion of the horizontal members 12 and 13 supporting both platform 14 and board 10.

Figure 3:
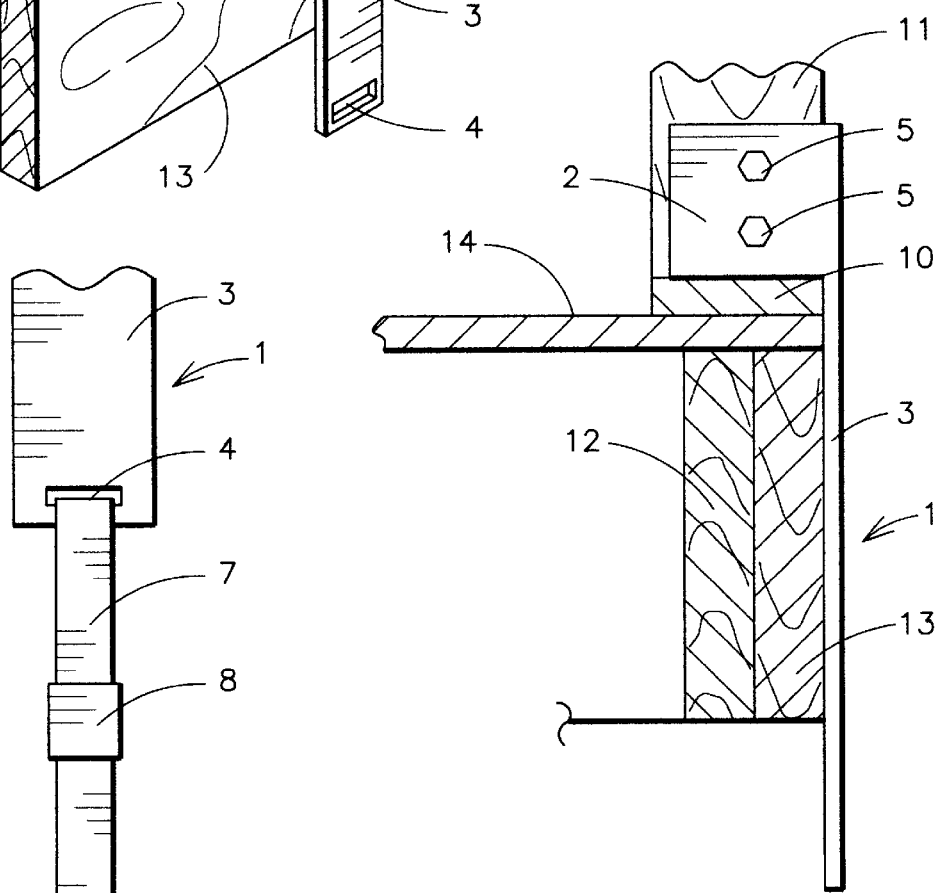
FIG. 3 is a side cut-away view of the tie connector showing a bolt penetrating through a vertical support member thereby securing the tie connector to the wall of the modular building.

Referring now to FIG. 3, we see a side view of a tie connector 1 having a side surface 3 being abutted against a horizontal support member 13. A portion of the side surface 3 extending downward beneath the horizontal support member 13. The top vertical flap 2 of the tie connector 1 having a bolt 5 inserted through and affixed to a vertical support member 11. The horizontal support member 12 being abutted against horizontal support member 13 and supporting a platform 14 and board 10. Both platform 14 and board 10 supporting vertical support member 11.

Figure 4:
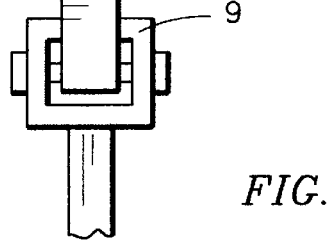
FIG. 4 is front view of the bottom portion of the tie connector affixed to a hurricane strap which in turn is affixed to a hurricane buckle or seal. The hurricane buckle in turn is affixed to a hurricane ground anchor.

Referring now to FIG. 4, we see a front view of the bottom portion of the tie connector 1 having a side surface 3 with an elongated slot 4 at one end. A hurricane strap 7 is inserted through the tie connector 1 via the elongated slot 4 and secured to the other end by a hurricane buckle 8. The opposite portion of the hurricane strap 7 is affixed to a hurricane ground anchor 9 that is secured to the ground.

Figure 5:
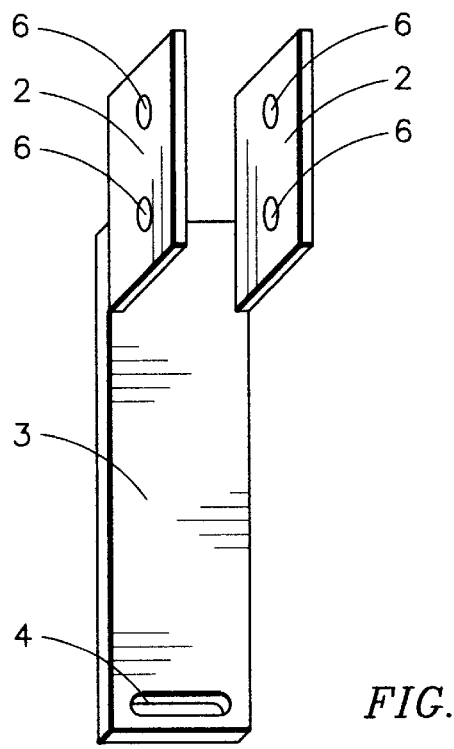

Referring now to FIG. 5, we see an orthographic view of the tie connector 1 having a side surface 3 with an elongated slot 4 at the bottom end. The tie connector 1 having a top vertical flaps 2 with an openings 6 to allow at least one bolt to be inserted to serve as an affixing means.

Figure 6:
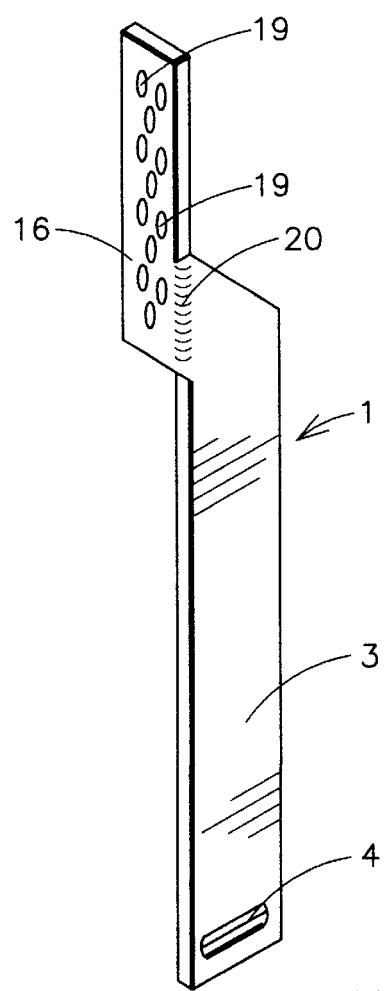
FIG. 6 is an orthographic view of a different version of the tie connector showing a vertical flap secured onto the tie connector in a relatively perpendicular fashion.

Referring to FIG. 6, we see an alternate version of the tie connector 1 having a vertical flap 16 in a perpendicular fashion relative to side surface 3. The vertical flap 16 having at least one opening 19 to allow bolts to be inserted. The vertical flap 16 being connected to side surface 3 at bend site 20. Similarly, an elongated slit 4 is located at one end of a side surface 3 of the tie connector 1.

Figure 7:
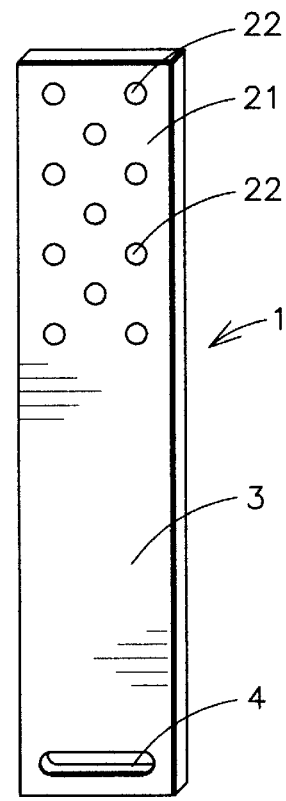
FIG. 7 is an orthographic view of a tie connector having a flat rectangular body with at least one bolt hole at one end and an elongated slot at the other end.

Referring to FIG. 7, we see a tie connector 1 with a side surface 3 with an elongated slot 4 at one end. A vertical flap 21 forming the top part of the tie connector 1 having at least one opening 22 to allow at least one bolt to the inserted through.

Accordingly, a very unique apparatus is provided for joining modular type buildings to a hurricane type ground anchor via a tie connector and hurricane type strap.

Since minor changes and modifications varied to fit particular operating requirements and environments will be understood by those skilled in the art, the invention is not considered limited to the specific examples chosen for purposes of illustration, and includes all changes and modifications which do not constitute a departure from the true spirit and scope of this invention as claimed in the following claims and reasonable equivalents to the claimed elements.

What is claimed is:

1. A tie connector joining a factory made building to a ground anchor, said factory made building having a support member, said tie connector affixed to the support member, and a hurricane strap connected to the tie connector and the ground anchor, the tie connector comprising:
   (a) an upper body section abutting the support member depending vertically therefrom;
   (b) means for affixing the upper body section to the support member; and
   (c) a lower body section connected to the upper body section having at least one slot receiving the strap and securing the strap to the ground anchor.

2. A tie connector as set forth in claim 1 wherein said elongated slot having rounded edges to eliminate any cutting affect of said strap during high stress conditions.

3. A tie connector as set forth in claim 1 wherein said length of said elongated slot being long enough to accept a given width of said hurricane strap.

4. A tie connector as set forth in claim 1 wherein said width of said elongated slot being wide enough to accept a given thickness of said hurricane strap.

5. A tie connector as set forth in claim 1 wherein said thickness of said tie connector being increased and decreased to accommodate high stress conditions and low stress conditions respectively.

6. A tie connector joining a factory made building to a ground anchor, said factory made building having a support member and the tie connector affixed to the support member, and a hurricane strap connected to the tie connector and to the ground anchor, said tie connector comprising:
   (a) an upper body section abutting the support member and depending vertically therefrom;
   (b) a mounting plate attached to the upper body section extending in a plane perpendicular to said upper body section, said plate abutting a face of a support member and secured thereto; and
   (c) a lower body section, having at least one slot receiving the hurricane strap, attached to the upper body section.

7. A tie connector as set forth in claim 6 wherein said length of said elongated slot being long enough to accept a given width of said hurricane strap.

8. A tie connector as set forth in claim 6 wherein said width of said elongated slot being wide enough to accept a given thickness of said hurricane strap.

9. A tie connector as set forth in claim 6 wherein said thickness of said tie connector being increased and decreased to accommodate high stress conditions and low stress conditions respectively.

10. A tie connector as defined in claim 6, wherein said mounting plate is an extension of the upper body section and is twisted in a substantially perpendicular plane in relation to said upper body section, securing said factory made building to a ground anchor, said modular building having a support member affixing the tie connector to the modular building, and a hurricane strap securing the tie connector to the ground anchor.

11. A tie connector joining a factory made building to a ground anchor, wherein said factory made building has a support member, the tie connector is affixed to the support member, and a hurricane strap connected to said tie connector and the ground anchor, said tie connector comprising:
   (a) an upper body section abutting a vertically disposed surface of the support member, and vertically depending therefrom;
   (b) a lower U-shaped body section, integral the bottom of said upper body section forming a slot and receiving the hurricane strap;
   (c) at least one mounting plate extending in a plane perpendicular to the upper body section, attached to upper body section distal the U-shaped body; and
   (d) means, for securing the mounting plates to the vertically disposed surface of the support member.

12. A tie connector as set forth in claim 11 wherein said length of said elongated slot being long enough to accept a given width of said hurricane strap.

13. A tie connector as set forth in claim 11 wherein said width of said elongated slot being wide enough to accept a given thickness of said hurricane strap.

14. A tie connector as set forth in claim 11 wherein said thickness of said tie connector being increased and decreased to accommodate high stress conditions and low stress conditions respectively.

15. A tie connector as set forth in claim 11 wherein said flaps being arranged a distance apart from each other to accommodate a width of said vertical support member.

16. A tie connector as set forth in claim 11 wherein said holes of said flaps being symmetrically aligned to allow a single bolt to be inserted through.

17. A tie connector as defined in claim 1 wherein said affixing means includes a mounting plate integral the upper body section and abutting the support member and having at least one aperture receiving a bolting means.

18. A tie connector as defined in claim 1 wherein said affixing means includes at least one mounting plate connected to the upper body section distal the lower body section and perpendicular the upper body section, for abutting a coplanar surface of the support member.

19. A tie connector as defined in claim 1 wherein said affixing means includes a pair of parallel mounting plates connected to the upper body section distal said lower body section for receiving a vertically disposed section of the support member.

20. A tie connector with a ground anchor secured in ground and hurricane strap securing a modular building to the ground anchor, comprising:
   (a) a support member affixed to the modular building and having a vertically disposed surface;
   (b) an upper body section abutting the vertically disposed surface depending therefrom in a substantially vertical plane;
   (c) means for affixing upper body section to the vertically disposed surface; and (d) a lower body section connected to the upper body section below a point of attachment to the vertically disposed surface, forming a slot receiving the hurricane strap.

21. A tie connector as defined in claim 20 wherein said affixing means of the tie connector includes at least one mounting plate attached to the upper body section distal the lower body section and extending in a plane perpendicular to the upper body section and a bolt means affixing the mounting plate to the support member.

22. A tie connector as defined in claim 21 wherein said mounting plate is an extension of the upper body section, integral therewith and extending in a plane perpendicular to the upper body section, and abutting a vertically disposed surface of the support member that is perpendicular to the upper body section.

23. A tie connector as defined in claim 20 wherein the affixing means for the tie connector includes two parallel mounting plates mounted to the upper body section, perpendicular therewith, and distal the slot, forming a channel, with said vertically disposed surface of the support member inserted in said channel.

24. A tie connector joining a factory made building to a ground anchor, said factory made building having a support member, and said tie connector affixed to the support member, and a hurricane strap connected to the tie connector and to the ground anchor, the tie connector comprising:

(a) an upper body section abutting the support member and extending downward vertically therefrom;

(b) a pair of mounting plates attached to the upper body section, in perpendicular relationship to said upper body section and parallel to each other, each said mounting plate coextensive with a surface on the support member; and (c) a lower body section attached to the upper body section upper body section, whereby said lower body section has at least one slot receiving the strap connecting the tie connector and the ground anchor.

25. A tie connector for joining a factory made building to a ground anchor, comprising:

(a) an upper body section;

(b) means, on said upper body section, through which a fastener may be inserted; and (c) a lower body section attached to upper body section depending therefrom, and coplanar with said upper body section, said lower body section having a slot capable of receiving a hurricane strap.

26. A tie connector for securing a factory made building to a ground anchor, comprising:

(a) an upper body section;

(b) a lower body section connected to the upper body section depending therefrom and substantially coplanar with the upper body section;

(c) means, in the lower body section for receiving in said lower body section a hurricane strap, which is capable of being secured to the ground anchor; and (d) a pair of mounting plates, attached to the upper body section, distal the hurricane strap receiving means, said mounting plates extending in perpendicular relation to said upper body section and parallel to one another, and having apertures through which fasteners are capable of being inserted for affixing the connector to the modular building.

* * * * *